(12) United States Patent
Hanada

(10) Patent No.: US 7,624,629 B2
(45) Date of Patent: Dec. 1, 2009

(54) TIRE CHARACTERISTIC JUDGING METHOD AND TIRE CHARACTERISTIC JUDGING DEVICE

(75) Inventor: Ryoji Hanada, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 12/143,651

(22) Filed: Jun. 20, 2008

(65) Prior Publication Data

US 2009/0000371 A1    Jan. 1, 2009

(30) Foreign Application Priority Data

Jun. 26, 2007   (JP)   ............... 2007-167289

(51) Int. Cl.
*G01M 17/02*   (2006.01)
(52) U.S. Cl. .................................... 73/146
(58) Field of Classification Search .......... None
See application file for complete search history.

(56) References Cited

U.S. PATENT DOCUMENTS

| | | | | |
|---|---|---|---|---|
| 5,892,139 A | * | 4/1999 | Miyazaki | .................. 73/9 |
| 6,543,278 B1 | * | 4/2003 | Kogure | ................. 73/146 |
| 6,754,615 B1 | * | 6/2004 | Germann et al. | ............ 703/8 |
| 7,333,008 B2 | * | 2/2008 | Yanase | ................. 340/444 |
| 7,469,578 B2 | * | 12/2008 | Matsuda et al. | ............ 73/146 |
| 7,483,821 B2 | * | 1/2009 | Miyashita et al. | ............ 703/8 |
| 2005/0005692 A1 | * | 1/2005 | Giustino | ................. 73/146 |

FOREIGN PATENT DOCUMENTS

JP    2003-226259    8/2003

* cited by examiner

*Primary Examiner*—Andre J Allen
*Assistant Examiner*—Jermaine Jenkins
(74) *Attorney, Agent, or Firm*—Knobbe Martens Olson & Bear, LLP (57) ABSTRACT

A tire characteristic judging device judges a tire characteristic in the following way. At first, a load applied to a tire and a cornering force generated in the tire in time series while the tire is rolling are acquired. Then, an applied load variation amount is calculated from the acquired time-series applied load information and a cornering force variation amount calculated from the acquired time-series cornering force information. Next, an evaluation value is calculated based on the applied load variation amount and the cornering force variation amount. The calculated evaluation value and a preset reference value are compared with each other and whether or not the tire satisfies a desired characteristic is judged according to a result of comparison.

15 Claims, 6 Drawing Sheets

TIRE CHARACTERISTIC JUDGING METHOD AND TIRE CHARACTERISTIC JUDGING DEVICE

CROSS REFERENCE TO RELATED APPLICATION

This application claims the benefit and priority to Japanese Application Number 2007-167289 filed on Jun. 26, 2007, the disclosure of which is hereby incorporated by reference in its entirety.

BACKGROUND OF THE INVENTION

1. Field of the Invention

The present invention relates to a method and a device for judging a characteristic of a tire. In particular, the present invention relates to a method and a device for judging the degree of running stability performance of a tire, which represents the degree of handling stability and controllability of a vehicle when the vehicle, on which the tire to be judged is mounted, is driven.

2. Description of the Related Art

Today, in response to enhanced motion performance of automobiles, tires to be mounted on the automobiles are requested to have higher running stability performance of the tire. The running stability performance of the tire corresponds to the degree of running stability obtained when a vehicle, on which the tire is mounted, is driven. The degree of running stability obtained when the vehicle is driven is represented by the degree of handling stability and controllability felt by a driver who drives and handles the vehicle. Specifically, the running stability of the tire is an index for the feeling of a driver of a vehicle, and is basically evaluated by a subjective evaluation carried out by the actual steering of a vehicle (on which tires are mounted) which is driven and steered by a test subject (actual vehicle steering feeling test). For the actual vehicle steering feeling test, however, time and equipment (a vehicle, a driving course and the like) required for the evaluation are enormous, resulting in need of high cost. For this reason, a method of evaluating the running stability performance of the tire without carrying out the costly actual vehicle steering feeling test has been conventionally demanded.

Conventionally, the running stability performance of the tire has been obtained by, for example, using known drum type or flat belt type indoor cornering test devices. To carry out the evaluation of the running stability performance of the tire by using the cornering test device, for example, a slip angle is applied to a tire while the tire is rolling on a road surface of the cornering test device at a constant rolling speed. In this manner, a frequency response characteristic of a cornering force at the rolling speed is obtained. The known indoor cornering test device is used to obtain an absolute value of the cornering force generated in the tire, which serves as a measure for determining the dynamic performance of the tire. The frequency response characteristic of the tire is also used for evaluating a transient response characteristic of the cornering force in response to a variation of slip angle. In general, the controllability of the vehicle is improved and the degree of running stability felt by the driver of the vehicle becomes higher as the cornering force generated in the tire becomes greater. Conventionally, the degree of the cornering force is obtained mainly from the test result obtained by the indoor cornering test device. Then, the running stability performance of the tire is evaluated according to the degree of the cornering force.

In order to ensure the running stability of the vehicle, Japanese Patent Application Laid-Open No. 2003-226259 (hereinafter, referred to as Patent Document 1) describes a method and a device for adjusting an alignment of a vehicle, for adjusting the alignment such as a toe angle or a camber angle of each wheel mounted on a vehicle to allow a stability factor to be equal to or higher than a reference value. The stability factor represents the running stability of the vehicle mainly when the vehicle runs straight. Patent Document 1 proposes the alignment adjustment method in consideration even of the effects of a variation of lateral force generated by the application of a disturbance such as the irregularity of a road surface (paragraph [0005] in Patent Document 1 and the like).

Specifically, when the tire rolls on a road surface having irregularity in contact therewith, the tire is deformed by a variation of load generated by the vertical movement of the road surface relative to the tire. This deformation of the tire varies a lateral force having load dependency, called plysteer, which is caused by a structural factor of the tire, a lateral force having load dependency, called conicity, which is caused for manufactural reasons, and a lateral force generated by applying the slip angle (toe angle) to the wheel. Since the variations in lateral force greatly affect the running stability, the alignment adjustment method in consideration of the effects of the variations in lateral force has been proposed.

More specifically, the tires, which are mounted on the vehicle, are placed on a tire-driving surface having a plurality of protrusions. Then, the tire-driving surface is driven. Each of the tires rolls on the tire-driving surface while being caused to pass over each of the plurality of protrusions. During the rolling, a variation of tire lateral force generated by the deformation of the tire, which is caused by running over the protrusion and running down from the protrusion, is detected by a sensor. In this manner, the variation of tire lateral force generated by the deformation of the tire is detected for each of the tires to obtain the maximum value of the detected amount of variation of tire lateral force (lateral force variation amount). Based on the lateral force variation amount of each of the tires, the alignment such as the toe angle or the camber angle of each of the wheels mounted on the vehicle is adjusted to set the stability factor, which represents the running stability of the vehicle mainly when the vehicle is running straight, to the reference value or higher.

According to the above-mentioned conventional method for evaluating the running stability performance of the tire by using the indoor cornering test device, however, the result of evaluation of the running stability performance of the tire, which is obtained by using the indoor cornering test device, is not identical with that obtained by the actual vehicle steering feeling test at good accuracy. The result of evaluation of the running stability performance of the tire, which is obtained by the actual vehicle steering feeling test, corresponds to numeric information representing the degree of running stability actually felt by a driver who drives a vehicle when the vehicle, on which a tire to be evaluated is mounted, is actually driven.

The method described in Patent Document 1 has an object of adjusting the alignment such as the toe angle or the camber angle of each wheel mounted on the vehicle to allow the stability factor representing the running stability of the vehicle mainly when the vehicle runs straight to be equal to or higher than the reference value. Although the method described in Patent Document 1 can adjust the alignment of each of the wheels mounted on the vehicle, the running stability performance of each tire cannot be judged. If the running stability performance of the tire is varied for each tire mounted on the wheel, there is a possibility that the alignment such as the toe angle or the camber angle may be greatly varied from its standard state. In this case, for example, the running stability in cornering which is other than the running stability in straight, is conversely greatly lowered. It is important to judge the running stability performance of the tire even for carrying out the method described in Patent Document 1. Nevertheless, Patent Document 1 does not suggest a technique of judging the running stability performance of the tire.

Moreover, Patent Document 1 takes notice of the deformation of the tire, which is generated when the tire passes over the convex portion of the road surface while the vehicle is running straight, to provide the method and the device described therein under the idea that the variation of lateral force generated in the tire, which is caused by the deformation, and the running stability of the vehicle when the vehicle is running straight are associated with each other. In vehicle cornering, the load applied to the tire greatly varies due not only to the deformation generated by the tire passing over the convex portion of the road surface but also to an extremely small rolling behavior of the vehicle, which is caused by the relation between a centrifugal force and a suspension, stick-slip caused on a ground-contact surface of the tire, a resonance phenomenon between the suspension of the vehicle and the tire, and the like. The method and the device described in Patent Document 1 do not suggest a method of obtaining the running stability of the vehicle in cornering.

Further, according to the method described in Patent Document 1, the vehicle is placed on the cornering test device, and the tire is evaluated based on the combination of the single tire and the suspension. Therefore, the result of evaluation of the tire adversely varies depending on the suspension of the vehicle. Further, a laborious task for placing the vehicle on the cornering test device is required. Thus, the labor and the time required for the test are enormous, resulting in extremely high test cost.

SUMMARY OF THE INVENTION

In order to solve the above-mentioned problems, the present invention has an object of providing a method and a device for judging running stability performance of a tire.

The present invention provides a tire characteristic judging method of judging a tire characteristic. The method comprises the steps of:

acquiring each of applied load information representing a load applied to a tire and cornering force information representing a cornering force generated in the tire in time series while the tire is rolling at a predetermined rolling speed to be in contact with a road surface with a predetermined slip angle being applied to the tire;

calculating an applied load variation amount representing a time-series variation of the applied load information from the acquired time-series applied load information and a cornering force variation amount representing a time-series variation of the cornering force information from the acquired time-series cornering force information;

obtaining an evaluation value determined based on the applied load variation amount and the cornering force variation amount; and comparing the evaluation value and a preset reference value with each other and judging whether or not the tire satisfies a desired characteristic according to a result of comparison.

In the method, it is preferable that the load applied to the tire is applied by a load application machine for applying the load to the tire in the step of acquiring each information; and the load application machine performs a feedback control to make the load applied to the tire closer to a given value according to a value of the currently acquired applied load information during the step of acquiring each information.

It is also preferable that the load applied to the tire is applied by a load application machine for applying the load to the tire in the step of acquiring each information; and the load application machine varies the applied load in time during the step of acquiring each information. Then, preferably, a distance between a tire shaft of the tire and a ground-contact surface is obtained in time series; and the load application machine adjusts the distance according to information of the currently acquired distance to make the distance to be a target distance which corresponds to a preset time-series condition of the distance, thereby varying the applied load in time series.

It is still also preferable that the method further comprises repeating the steps of acquiring each information and calculating the variation amounts prior to the step of obtaining the evaluation value, wherein:

Plural sets of the applied load variation amount and the cornering force variation amount, each set obtained in each repetition time of the step of calculating the variation amounts are used to derive an approximate function expression which represents a relation between the applied load variation amount and the cornering force variation amount in an approximated manner in the step of obtaining the evaluation value; and the derived approximate function expression is used to calculate the evaluation value.

Then, the approximate function expression may be a linear function expression in which the cornering force variation amount is determined according to the applied load variation amount; and a slope of the linear function expression may be calculated as the evaluation value.

It is preferable that a value of the cornering force variation amount when the applied load variation amount is within a predetermined range is calculated as the evaluation value in the step of calculating the evaluation value; and the predetermined range corresponds to 5 to 30% of an average value of the applied load information.

It is also preferable that a value of the cornering force variation amount when the applied load variation amount is a predetermined value is obtained as the evaluation value in the step of obtaining the evaluation value; and the predetermined value corresponds to 5% of the average value of the applied load information.

It is also preferable that the obtained evaluation value and the preset reference value are compared with each other in the step of the judging; a degree of handling stability and controllability of the tire is classified according to a result of comparison; and a result of classification is output. The reference value may be the evaluation value obtained for a standard tire in the step of obtaining the evaluation value, the standard tire having a known degree of the handling stability and controllability. The predetermined slip angle may be in a range of 1 to 3 degrees. The predetermined rolling speed may be in a range of 80 to 120 (km/hour).

The invention also provides a tire characteristic judging device for judging a tire characteristic, comprising:

an information acquisition portion for acquiring each of applied load information representing a load applied to a tire and cornering force information representing a cornering force generated in the tire in time series while the tire is rolling at a predetermined rolling speed to be in contact with a road surface with a predetermined slip angle being applied to the tire;

a variation amount calculating portion for calculating an applied load variation amount representing a time-series variation of the applied load information from the acquired time-series applied load information and a cornering force variation amount representing a time-series variation of the cornering force information from the acquired time-series cornering force information;

an evaluation value deriving portion for calculating an evaluation value determined based on the applied load variation amount and the cornering force variation amount; and a judgment portion for comparing the evaluation value and a preset reference value with each other and judging whether or not the tire satisfies a desired characteristic according to a result of comparison.

In the device, it is preferable that the acquiring the applied load information and the cornering force information and the calculating the applied load variation amount and the cornering force variation amount are repeated in the information acquisition portion and the variation amount calculating portion; and the evaluation value deriving portion uses plural sets of the applied load variation amount and the cornering force variation amount, each set calculated in each repetition time to derive an approximate function expression which represents a relation between the applied load variation amount and the cornering force variation amount in an approximated manner and uses the derived approximate function expression to calculate the evaluation value.

It is also preferable that the approximate function expression is a linear function expression representing the cornering force variation amount determined according to the applied load variation amount and a slope of the linear function expression is calculated as the evaluation value.

DETAILED DESCRIPTION OF THE PREFERRED EMBODIMENTS

Hereinafter, a tire characteristic judging method and a tire characteristic judging device are described in detail based on preferred embodiments illustrated in the accompanying drawings.

Figure 1:
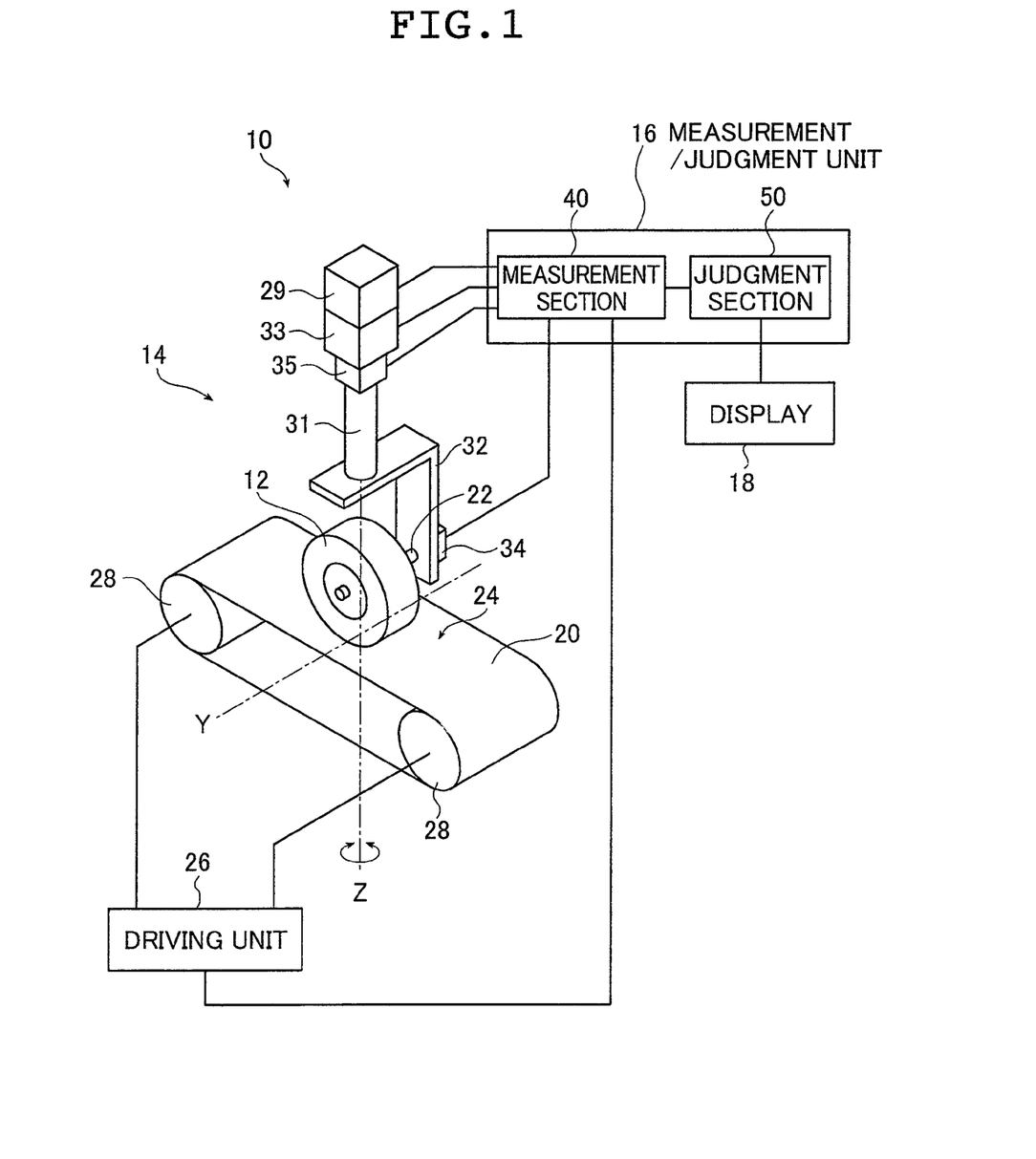
FIG. 1 is a schematic configuration diagram illustrating an example of a tire characteristic judging device according to the present invention.

FIG. 1 is a schematic configuration diagram for illustrating a tire characteristic judging device 10 (hereinafter, also referred to simply as the device 10) corresponding to an example of a tire characteristic judging device according to the present invention. The device 10 in this embodiment evaluates the degree of running stability of a tire. The running stability of the tire represents running stability of a vehicle (corresponding to handling stability and controllability of the vehicle felt by a driver) when the vehicle, on which a tire 12 corresponding to a tire to be measured is mounted for each wheel, is driven under set conditions such as a load, a pneumatic pressure, a speed, and a slip angle. For this purpose, the device 10 judges the degree of stability of a cornering force generated in the tire (the degree at which the cornering force remains unvaried) in response to a variation of load applied to the tire, which is caused during the cornering of the vehicle on which the tire 12 corresponding to a tire to be measured is mounted. The device 10 includes a cornering test device 14 and a measurement/judgment unit 16. A display 18 is connected to the measurement/judgment unit 16.

The cornering test device 14 is a known flat belt type indoor test device. The cornering test device 14 brings the tire 12, which is rotatably supported by a tire shaft 22, into contact with a simulated road surface 24 corresponding to a surface of a belt 20. The belt 20 is rotationally driven to cause the tire 12 to run (roll) on the simulated road surface 24.

The belt 20 is wound around a pair of rollers 28 (hereinafter, referred to as the roller pair 28). The roller pair 28 is connected to a driving unit 26 including a motor (not shown). The roller pair 28 is rotated by the motor of the driving unit 26 to move the simulated road surface 24 of the belt 20. The driving unit 26 is connected to a measurement section 40 of the measurement/judgment unit 16, which is described below.

The tire shaft 22 is provided to a tire shaft supporting member 32 to which a rod 31 is fixed. The rod 31 is connected to a load application machine 33 in a state displaceable in a Z-axis direction in FIG. 1. The Z-axis in FIG. 1 is a straight line passing through a center plane of the tire 12, which passes through the center of the tire shaft 22. The Z-axis is perpendicular to an axis of rotation center of the tire 12 (specifically, the center of the tire shaft 22). The load application machine 33 applies a downward load to the rod 31 along the Z-axis direction in FIG. 1 to push the tire 12 rotatably supported by the tire shaft 22 against the simulated road surface 24, thereby adjusting the load which is applied to the tire 12 by its ground-contact area. The load application machine 33 is connected to the measurement section 40 of the measurement/judgment unit 16, which is described below. The load application machine 33 is a known load application machine for, for example, hydraulically applying a load. The load application machine 33 can adjust the load applied to the tire 12 by a change in hydro-pressure of the load application machine 33, which is caused by an operation control portion 44 of the measurement section 40. The operation control portion 44 is described below.

The rod 31 is rotationally driven about the Z-axis in FIG. 1 by a slip angle adjustment actuator 29 corresponding to a slip angle adjustment device. The rod 31 is rotationally driven about the Z-axis in FIG. 1 to vary a slip angle of the rolling tire 12 (an angle formed between a rolling direction of the tire 12, that is, a moving direction of the simulated road surface 24, and the center plane of the tire 12). The slip angle adjustment actuator 29 is connected to the measurement section 40 of the measurement/judgment unit 16, which is described below.

The rod 31 is also provided with a load/displacement sensor 35. The load/displacement sensor 35 measures a force exerted on the rod 31 in the direction along the Z-axis in FIG. 1, that is, the load applied to the tire 12. The load/displacement sensor 35 can also measure the amount of displacement of the rod 31 in the Z-axis direction in FIG. 1. The amount of displacement of the rod 31 in the Z-axis direction in FIG. 1 represents a change in a distance between the tire shaft 22 supporting the tire 12 and the simulated road surface 22. The distance varies with the deformation of the tire 12, and the deformation of the tire 12 changes according to the load applied to the tire 12. Therefore, it can be said that the amount of displacement measured by the load/displacement sensor 35 indicates the load applied to the tire 12. The load/displacement sensor 35 is not particularly limited. The load/displacement sensor 35 may use a piezoelectric element or a strain gauge as long as the load/displacement sensor 35 can measure the force applied to the rod 31 in the direction along the Z-axis in FIG. 1. The load/displacement sensor 35 is connected to the measurement section 40 of the measurement/judgment unit 16, which is described below.

The tire shaft supporting member 32 is also provided with a lateral force sensor 34 which is capable of measuring the force applied to the tire shaft 22. The lateral force sensor 34 measures a force perpendicular to the center plane of the tire, which is exerted on the tire shaft 22 (force in a Y-axis direction in FIG. 1), that is, a tire lateral force. Since the slip angle is input within a relatively small range of the slip angle in the cornering test device 14 in this embodiment, the lateral force generated in the tire 12 is substantially equal to a cornering force (force perpendicular to the moving direction of the simulated road surface 24) generated in the tire 12. Hereinafter, the lateral force generated in the tire 12, which is measured by the lateral force 34, is treated as being equivalent to the cornering force generated in the tire 12. The lateral force sensor 34 is not particularly limited. The lateral force sensor 34 may use the piezoelectric element or the strain gauge as long as the lateral force sensor 34 can measure at least the lateral force applied to the tire shaft 22.

Figure 2:
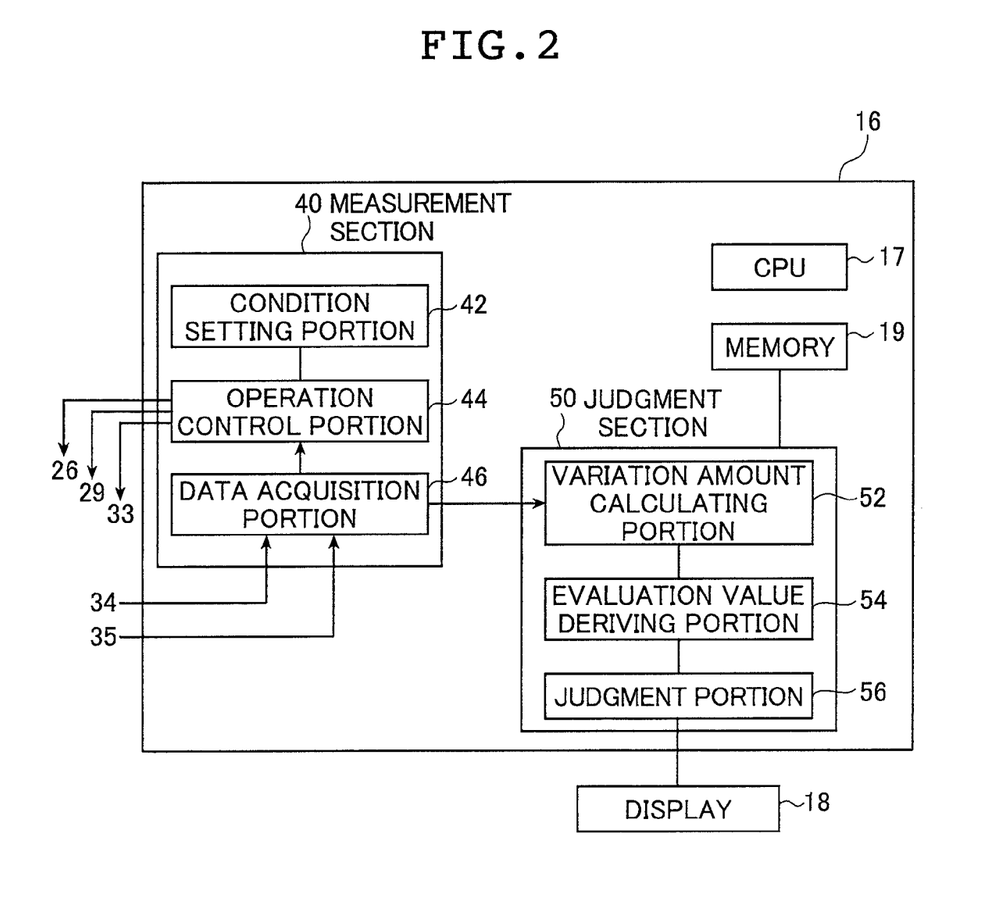
FIG. 2 is a schematic configuration diagram illustrating a measurement/judgment unit of the tire characteristic judging device illustrated in FIG. 1.

The measurement/judgment unit 16 includes the measurement section 40 and a judgment section 50. FIG. 2 is a schematic configuration diagram illustrating the measurement/judgment unit 16. The measurement/judgment unit 16 includes the measurement section 40, the judgment section 50, a CPU 17, and a memory 19. The measurement/judgment unit 16 is a computer. When the CPU 17 executes a program stored in the memory 19 by the CPU 17, each of the portions of the measurement section 40 and the judgment section 50 in the measurement/judgment unit 16 performs.

The measurement section 40 includes a condition setting portion 42, the operation control portion 44, and a data acquisition portion 46. The judgment section 50 includes a variation amount calculating portion 52, an evaluation value deriving portion 54, and a judgment portion 56.

The condition setting portion 42 of the measurement section 40 sets conditions of the slip angle applied to the tire 12 running on the simulated road surface 24, the rolling speed of the tire 12, the applied load, and the like. The measurement section 40 is connected to an input device (not shown) such as, for example, a keyboard and a mouse. The condition setting portion 42 receives various conditions input by an operator who operates the input device to set the various conditions. The condition setting portion 42 can also set a condition of the distance between the tire shaft 22 supporting the tire 12 and the simulated road surface 24 in place of or in addition to the condition of the applied load.

The operation control portion 44 controls the operation of each of the portions of the cornering test device 14 based on the conditions of the rolling speed, the slip angle and the applied road of the tire 12, the distance, and the like. The operation control portion 44 is connected to each of the driving unit 26, the slip angle adjustment actuator 29 and the load application machine 33. The operation control portion 44 controls the operation of the driving unit 26 (such as a rotation speed of the motor) to cause the tire 12 to roll at the rolling speed set by the condition setting portion 42. The operation control portion 44 also controls the operation of the slip angle adjustment actuator 29 (such as the rotation speed of the motor) to vary the slip angle of the tire 12 in time series according to the conditions set by the condition setting portion 42.

The operation control portion 44 also controls an operation of the load application machine 33 to bring the tire 12 into contact with the simulated road surface 24 by the applied load set by the condition setting portion 42 (first embodiment). The operation control portion 44 can also control the operation of the load application machine 33 to cause the tire 12 to roll on the simulated road surface 24 at the distance which is determined according to the condition of the distance, which is set by the condition setting portion 42 (second embodiment).

In the first embodiment, the operation control portion 44 sequentially receives information indicating the current load applied to the tire 12, which is obtained by the data acquisition portion 46 described blow, to sequentially adjust the load applied to the tire 12 through the rod 31 to make the load applied to the tire 12 closer to that set in the condition setting portion 42. Specifically, in the first embodiment, the device 10 causes the tire 12 to roll while using the operation control portion 44 and the load application machine 33 to perform feedback control to make the currently applied load closer to the preset applied load.

For the use in the first embodiment, the load application machine 33 and the operation control portion 44 are set to allow a variation of applied load during the feedback control to fall within the desired range of variation when the set load applied to the tire 12 is within the range of 1000 (N) to 6000 (N), which corresponds to the range of a load generally applied to the tire mounted on the vehicle. For example, the variation of applied load is set within the range where not a relatively large variation of applied load is reproduced due to the deformation of the tire 12, which is caused when the tire 12 passes over the convex portion of the road surface, but a subtle variation of load applied to the tire during the cornering of the vehicle is reproduced. Such a subtle variation of load applied to the tire is generated during the cornering of the vehicle, on which the tire 12 is mounted, by an extremely small rolling behavior of the vehicle caused by the relation between a centrifugal force and a suspension, stick-slip caused on a ground-contact surface of the tire, and a resonance phenomenon between the suspension of the vehicle and the tire. A general indoor cornering test device which uses the feedback control to set the applied load to a constant value can substantially correctly reproduce the subtle variation of applied load in its basic state of use. The tire characteristic judging method according to the present invention can be easily carried out by using the general indoor cornering test device.

In the second embodiment, the operation control portion 44 sequentially receives information indicating the distance between the tire shaft 22 for supporting the tire 12 and the simulated road surface 24, which is acquired by the data acquisition portion 46 described below, to adjust the distance so as to make the distance between the tire shaft 22 and the simulated road surface 24 to be closer to that set by the condition setting portion 42. In this manner, the load to be applied to the tire 12 by the load application machine 33 is adjusted. Specifically, the operation control portion 44 performs control based on the amount of displacement of the tire shaft 22 to make the current distance closer to the preset distance while monitoring the distance between the tire shaft 22 and the simulated road surface 24 in time series. For the use in the second embodiment, the condition setting portion 42 sets the condition of the distance according to the characteristics of the device 10 to allow the set load applied to the tire 12 within a desired range of variation (the condition is input by an operator). For example, the load application machine 33 and the operation control portion 44 are set to allow an average value (reference value) of the loads applied to the tire mounted on the vehicle to fall within the range of 1000(N) to 6000(N), which corresponds to the range of a load generally applied to the tire, and also to vary the applied load within the range of ±20% to ±30% of the reference value. The general indoor cornering test device which is capable of adjusting the applied load based on the amount of displacement of the tire shaft 22 can substantially correctly reproduce a relatively large variation of applied load in its basic state of use. The variation of applied load of this degree is frequently generated during the cornering of the vehicle, on which the tire 12 is mounted. When the variation of load applied to the tire is relatively large (in the range of ±20% to ±30% of the reference value), the characteristics of the tire itself (for example, the relation between the slip angle and the lateral force) vary.

The data acquisition portion 46 acquires various measurement data measured while the tire 12 is rolling at the set rolling speed in time series. Specifically, for example, in the first embodiment, the data acquisition portion 46 acquires applied load information indicating the applied load measured by the load/displacement sensor 35 from the load/displacement sensor 35 in time series. The data acquisition portion 46 also acquires tire lateral force information indicating the tire lateral force measured by the lateral force sensor 34 from the lateral force sensor 34 in time series. In the second embodiment, the data acquisition portion 46 acquires displacement amount information indicating the distance measured by the load/displacement sensor 35 in time series and also acquires the tire lateral force information indicating the tire lateral force measured by the lateral force sensor 34 from the lateral force sensor 34 in time series. The time-series applied load information and the time-series tire lateral force information acquired by the data acquisition portion 46 are transmitted to the variation amount calculating portion 52 of the judgment section 50.

The judgment section 50 performs the same operation in both of the first and second embodiments. The variation amount calculating portion 52 of the judgment section 50 derives the amount of variation of applied load (hereinafter, referred to as the applied load variation amount), which indicates a time-series variation of applied load information, from the acquired time-series applied load information and also derives the amount of variation of tire lateral force (hereinafter, referred to as the tire lateral force variation amount), which indicates a time-series variation of tire lateral force information, from the acquired time-series tire lateral force information. An operation of the variation amount calculating portion 52 is described in detail below.

The evaluation value deriving portion 54 of the judgment section 50 receives the applied load variation amount and the tire lateral force variation amount calculated in the variation amount calculating portion 52 to derive an evaluation value based on the applied load variation amount and the tire lateral force variation amount. In the embodiments of the present invention, an evaluation value indicating the degree of running stability performance of the tire 12 while the tire 12 is rolling at the set slip angle is derived as the evaluation value.

The judgment portion 56 of the judgment section 50 judges based on the evaluation value derived in the evaluation value deriving portion 54 whether or not the tire 12 corresponding to the tire to be judged satisfies a desired characteristic. In the embodiments of the present invention, the judgment portion 56 judges whether or not the degree of the running stability performance of the tire 12 is above a reference level. Specifically, in the embodiments of the present invention, the judgment portion 56 determines whether or not the tire 12 has sufficient running stability. The result of judgment in the judgment portion 56 is output to and displayed on, for example, the display 18. In addition to the result of judgment in the judgment portion 56, each piece of information derived by processing of each of the portions in the judgment section 50 is output to and displayed on the display 18.

Figure 3:
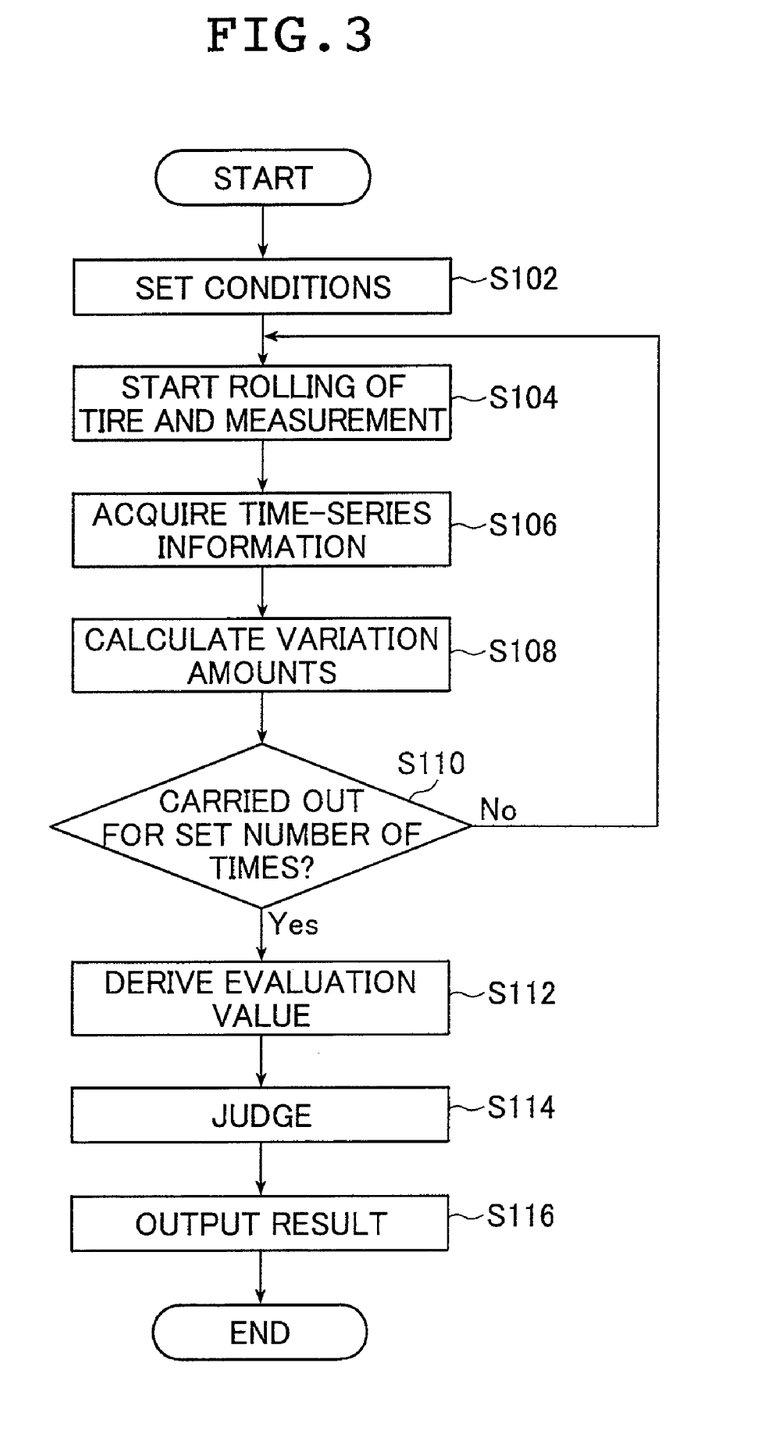
FIG. 3 is a flowchart illustrating an example of a tire characteristic judging method according to the present invention.

FIG. 3 is a flowchart illustrating an example of the tire characteristic judging method according to the present invention, which is carried out in the device 10. Hereinafter, in addition to the description of the example of the tire characteristic judging method according to the present invention, a function of each of the portions in the device 10 is described in detail.

First, the first embodiment is described.

In the first embodiment, the tire 12 is rolling during the feedback control for making the currently applied load closer to the preset applied load.

First, the condition setting portion 42 sets the conditions of the slip angle to be applied to the tire 12 rolling on the simulated road surface 24, the rolling speed of the tire 12, the applied load, and the like. In this first embodiment, the number of times of repetition of a processing sequence in Steps S104 to S108 described below, which is carried out for the single tire 12 to be judged, is also set.

In this first embodiment, as the condition of the slip angle applied to the tire 12 is set, in which the slip angle sharply rises up to a target value and keeps the target value for a time longer than a predetermined time.

Specifically, in this first embodiment, the slip angle is input as a so-called ramp step to the tire 12. The reason why the slip angle is input as a ramp step is as follows. Besides the judgment of the running stability performance of the tire 12 described below, a frequency response characteristic of the cornering force of the tire is additionally obtained by using the information acquired by the device 10. In this manner, by using the ramp step, various evaluations of the tire 12 can also be obtained based on the obtained frequency response characteristic.

For example, the slip angle is applied to the tire 12 by the ramp step while the tire is rolling on the road surface at a constant rolling speed. In this manner, a frequency response characteristic (response characteristic with respect to a distance frequency) of the cornering force at the rolling speed can be obtained. Further, coefficients of a transfer function, which indicate the responsibility of the cornering force with respect to a variation of slip angle, are identified from the frequency response characteristic of the cornering force at the rolling speed. In this manner, the cornering power generated in the tire or a tire lateral stiffness can be evaluated. In the other way round, according to the tire characteristic judging method of the present invention, the evaluation of the running stability performance of the tire in addition to the conventional evaluations obtained by using of the known tire characteristics which are measured by the indoor cornering test device are carried out. As a method of evaluating the cornering power generated in the tire or the tire lateral stiffness from the frequency response characteristic of the cornering force is described in detail in, for example, Japanese Patent Application No. 2006-107257 which is the prior application by the applicant of the present application.

In this first embodiment, the condition setting portion 42 sets a predetermined speed within the range of 80 to 120 km/hour as the condition of the rolling speed of the tire 12. The condition of the rolling speed of the tire 12 is set within the above-mentioned range for judging the running stability of the tire at an actual running speed at which the handling stability and controllability of the vehicle become critical. As the condition of the slip angle input as the ramp step, for example, the condition for increasing the slip angle from 0 (degree) to 1.0 (degree) in 0.25 (seconds) and then keeping the slip angle of 1.0 (degree) for at least 1.0 (second) or longer is set. The load applied to the tire 12 is set to keep a constant value of, for example, 4000(N) by, for example, the feedback control. In this first embodiment, the number of times of repetition of the processing in Steps S104 to S108 described below for the single tire to be measured is also set.

After the conditions are set, the tire 12 rolls to start the measurement of the applied load and the tire lateral force (Step S104). The tire 12 rolls, being measured by the control of the operation of each of the sections and the portions of the cornering test device 14 by the operation control portion 44. The operation control portion 44 controls the operation of the each of the sections and the portions of the cornering test device 14 based on the conditions of the rolling speed, the slip angle, and the applied load of the tire 12, which are set in the condition setting portion 42.

When the tire 12 rolls to start the measurement of the applied load and the tire lateral force, the data acquisition portion 46 acquires each piece of various measurement data in time series (Step S106). Specifically, the data acquisition portion 46 acquires the applied load information indicating the applied load measured by the load/displacement sensor 35 in time series from the load/displacement sensor 35 and the tire lateral force information indicating the tire lateral force measured by the lateral force sensor 34 in time series from the lateral force sensor 34. During the acquisition of the applied load information and the tire lateral force information after the start of the measurement of the applied load and the tire lateral force, the operation control portion 44 and the load application machine 33 constantly perform the feedback control to make the currently applied load closer to the preset applied load. Specifically, the operation control portion 44 sequentially receives the information indicating the current load applied to the tire 12, which is acquired by the data acquisition portion 46 described below, to constantly adjust the load applied to the tire 12 through the rod 31 to make the load applied to the tire 12 closer to that set in the condition setting portion 42.

Figure 4A:
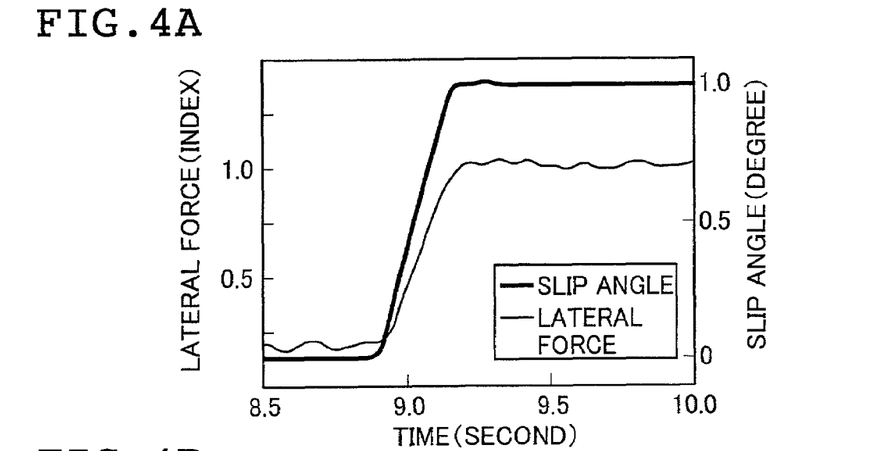
FIG. 4A is a graph showing a time-series variation of slip angle which is input to a measured tire and that of tire lateral force.
Figure 4B:
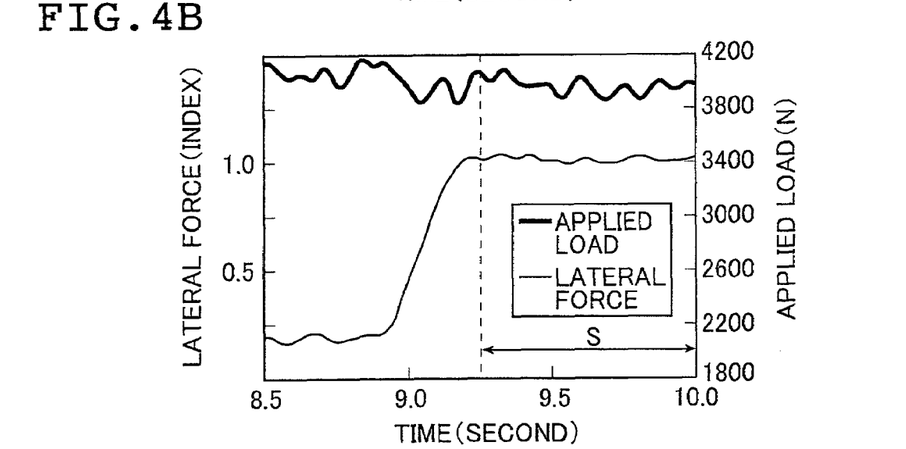
FIG. 4B is a graph showing the time-series variation of tire lateral force and that of load applied to the tire.

FIGS. 4A and 4B illustrate an example of various data measured in the device 10. FIG. 4A is a graph showing a time-series variation of slip angle input to the tire 12 and a time-series variation of tire lateral force acquired by the data acquisition portion 46 from the lateral force sensor 34 in the device 10. FIG. 4B is a graph showing the time-series variation of tire lateral force and a time-series variation of load applied to the tire, which is acquired by the data acquisition portion 46 from the load/displacement sensor 35. As shown in FIG. 4B, the load applied to the tire 12 repeatedly slightly varies up and down around the value set in the condition setting portion 42. Such a time-series variation of applied load is generated by the nonuniformity of the tire or the feedback control.

Next, the variation amount calculating portion 52 of the judgment section 50 acquires each piece of the time-series information sent from the data acquisition portion 46 to calculate the applied load variation amount indicating the amount of a time-series variation of applied load information from the acquired time-series applied load information. The variation amount calculating portion 52 also calculates the tire lateral force variation amount indicating the amount of a time-series variation of tire lateral force information from the acquired time-series tire lateral force information (Step S108). The variation amount calculating portion 52 calculates the applied load variation amount from the time-series applied load information within a predetermined time range after the slip angle reaches the set value. The variation amount calculating portion 52 calculates the tire lateral force variation amount from the time-series tire lateral force information within a predetermined time range after the slip angle reaches the set value. For example, a time after elapse of 0.1 (second) from the time at which the slip angle reaches the predetermined value under the set condition of the ramp step is used as a point of origin. A time range for 0.9 (seconds) from the point of origin is set as the predetermined time range S (see FIG. 4B; in the example illustrated in FIG. 4B, a time range over about 0.75 (seconds) is illustrated as the predetermined time range S) for calculating the applied load variation amount and the tire lateral force variation amount.

Figure 5:
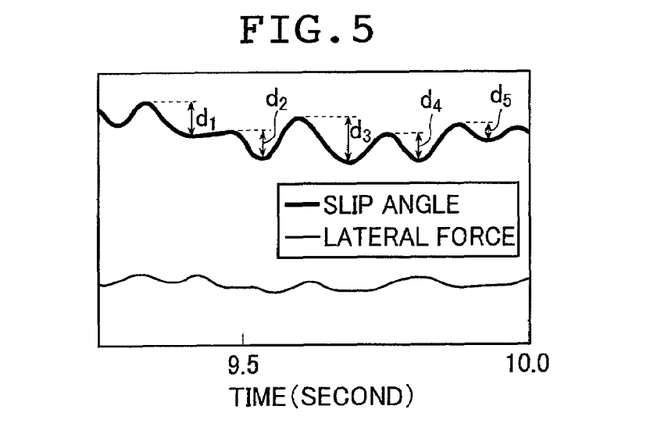
FIG. 5 is a view showing a predetermined time range S in an enlarged manner for the graph illustrated in FIG. 4B showing time-series applied load information and time-series tire lateral load information.

FIG. 5 is a view showing the time-series applied load information and the time-series tire lateral force information in an enlarged manner of the predetermined time range S. In this first embodiment, for calculating the applied load variation amount, the variation amount calculating portion 52 calculates differences $d_1$ to $d_n$, each being a difference between the maximum value and the minimum value adjacent to the maximum value, in the graph of the time-series variation of the applied load information for all the (n) combinations of the maximum value and the minimum value within the predetermined time range S. Next, the variation amount calculating portion 52 calculates an average value of the obtained differences $d_1$ to $d_n$ as the applied load variation amount. Similarly, for the tire lateral force variation amount, an average value of the differences between the maximum value and the minimum value, which are adjacent to each other, are calculated as the tire lateral force variation amount (not shown in FIG. 5). The applied load variation amount in this first embodiment represents a subtle variation of applied load when the applied load is constantly controlled to be closer to the given value (set value) by the feedback control after the applied load reaches the set value. The tire lateral force variation amount in this first embodiment represents a subtle variation of tire lateral force, which is caused in response to the subtle variation of applied load generated with the feedback control. The derived applied load variation amount and tire lateral force variation amount are temporarily stored in the memory 19.

Next, for example, the CPU 17 judges whether or not the operation sequence in Steps S104 to S108 has been carried out for the number of times set in Step S102 (Step S110). When the operation sequence has not been carried out yet for the set number of times, the result of judgment in Step S110 is No and the processing in Steps S104 to S108 is repeated again for the tire 12. The processing in Steps S104 to S108 is repeated until the result of judgment in Step S110 becomes Yes. In this first embodiment, the processing in Steps S104 to S108 is repeated for, for example, five times for the tire 12. In this first embodiment, the applied load is subtly varied, which is generated by the nonuniformity of the tire or the feedback control, as described above. Therefore, the generated variation is not always constant. Specifically, if the variation of applied load is repeatedly measured, the variation of applied load changes for each measurement and the applied load variation amount also changes. Therefore, it is apparent that a state of the variation of tire lateral force, which is caused along with the variation of applied load, also changes, resulting in a change in tire lateral force variation amount.

Next, the evaluation value deriving portion 54 of the judgment section 50 receives the applied load variation amount and the tire lateral force variation amount, which are calculated and stored by the variation amount calculating portion 52 for each repetition, from the memory 19 to derive the evaluation value based on the applied load variation amount and the tire lateral force variation amount (Step S112). In this first embodiment, an approximate function expression is derived, which shows the relation between the applied load variation amount and the tire lateral force variation amount in an approximated manner from plural sets (specifically, three sets in this first embodiment) of the applied load variation amount and the tire lateral force variation amount. The thus obtained approximate function expression is used to obtain the evaluation value. Specifically, a linear function expression is used as the approximate function expression. A slope of the linear function expression, which represents the tire lateral force variation amount determined according to the applied load variation amount, is obtained as the evaluation value by using the least squares method or the like. It is believed that the thus obtained evaluation value accurately represents the degree of the variation of tire lateral force generated in the tire 12 in response to the subtle variation of applied load.

The judgment portion 56 of the judgment section 50 judges whether or not the tire 12 to be judged satisfies a desired characteristic (Step S114). In this first embodiment, the judgment portion 56 judges whether or not the tire 12 has sufficient running stability. Specifically, in this first embodiment, the evaluation value for a predetermined standard tire, which is obtained in advance by using the device 10, is used as the reference value (prestored in the memory 19). Then, the reference value and the evaluation value calculated for the tire 12 are compared with each other. According to the result of comparison, the degree of handling stability and controllability of the tire is classified and judged. The reference value corresponds to an evaluation value for the standard tire, which is calculated by performing the same processing as that in Steps S102 to S112 by using the device 10. The standard tire is a tire which provides known running stability performance (handling stability and controllability performance) of the vehicle on which the tire is actually mounted and has standard running stability performance.

Specifically, the standard tire has the running stability performance of the tire pre-confirmed through a relatively long time or much labor, for example, by the actual vehicle steering feeling test. In this first embodiment, when the evaluation value calculated for the tire to be measured is larger than the reference value, the tire to be measured is judged as a tire without sufficient running stability performance. On the other hand, when the evaluation value calculated for the tire to be measured is smaller than the reference value, the tire to be measured is judged as a tire having sufficient running stability performance.

In the final step, the result of judgment obtained by the judgment portion 56 is output to and displayed on, for example, the display 18 (Step S116). At this time, besides the result of judgment obtained by the judgment portion 56, each piece of information derived by the processing of each portion of the judgment section 50 such as the graphs illustrated in FIGS. 4A to 5 may also be output to and displayed on the display 18.

The second embodiment of the invention of the present application is now described.

In this second embodiment, control based on the displacement of the tire shaft 22 (displacement control) is performed to make the current distance closer to the preset distance while monitoring the current distance between the tire shaft 22 and the simulated road surface 24 in time series. As in the case of the first embodiment, the second embodiment is carried out according to the flowchart shown in FIG. 3. Hereinafter, the second embodiment is described, particularly for differences from the first embodiment, referring to the flowchart shown in FIG. 3.

First, the condition setting portion 42 sets the conditions of the slip angle applied to the tire 12 rolling on the simulated road surface 24, the rolling speed of the tire 12, the distance between the tire shaft 22 and the simulated road surface 24, and the like (Step S102). The number of times of repetition of the processing sequence in Steps S104 to S108 described below, which is carried out for the tire 12 to be judged, is also set. As in the first embodiment, the slip angle for the tire 12 is input as the so-called ramp step in the second embodiment to allow the frequency response characteristic of the cornering force of the tire to be obtained.

Even in the second embodiment, the condition setting portion 42 sets a predetermined speed within the range of 80 to 120 km/hour as the condition of the rolling speed of the tire 12. As the condition of the slip angle input as the ramp step, for example, the condition for increasing the slip angle from 0 (degree) to 1.0 (degree) in 0.25 (seconds) and then keeping the slip angle of 1.0 (degree) for at least 1.0 (second) or longer is set. For the evaluation of a 15-inch tire, for example, the condition of repeating a reciprocating motion of the distance from 289 (cm) to 299 (cm) and from 299 (cm) to 289 (cm) at the cycle of 0.2 (seconds) is set as the condition of the distance. Each of the portions operates according to the condition of the distance to relatively greatly vary the load applied to the tire within the range of ±20% to ±30% of the reference value of, for example, 4000 (N) in the device 10.

After the conditions are set, the tire 12 rolls to start the measurement of the applied load and the tire lateral force (Step S104). The tire 12 rolls and is measured by the control of the operation of each of the sections and the portions of the cornering test device 14 by the operation control portion 44. The operation control portion 44 controls the operation of each of the sections and the portions of the cornering test device 14 based on the conditions set in the condition setting portion 42.

When the tire 12 rolls to start the measurement of the applied load and the tire lateral force, the data acquisition portion 46 acquires each piece of various measurement data in time series (Step S106). Specifically, the data acquisition portion 46 acquires the applied load information indicating the applied load measured by the load/displacement sensor 35 in time series from the load/displacement sensor 35 and the tire lateral force information indicating the tire lateral force measured by the lateral force sensor 34 in time series from the lateral force sensor 34. During the acquisition of the applied load information and the tire lateral force information after the start of the measurement of the applied load and the tire lateral force, the operation control portion 44 and the load application machine 33 constantly control the load applied to the tire to make the current distance (amount of displacement) closer to the preset distance (amount of displacement).

Figure 6A:
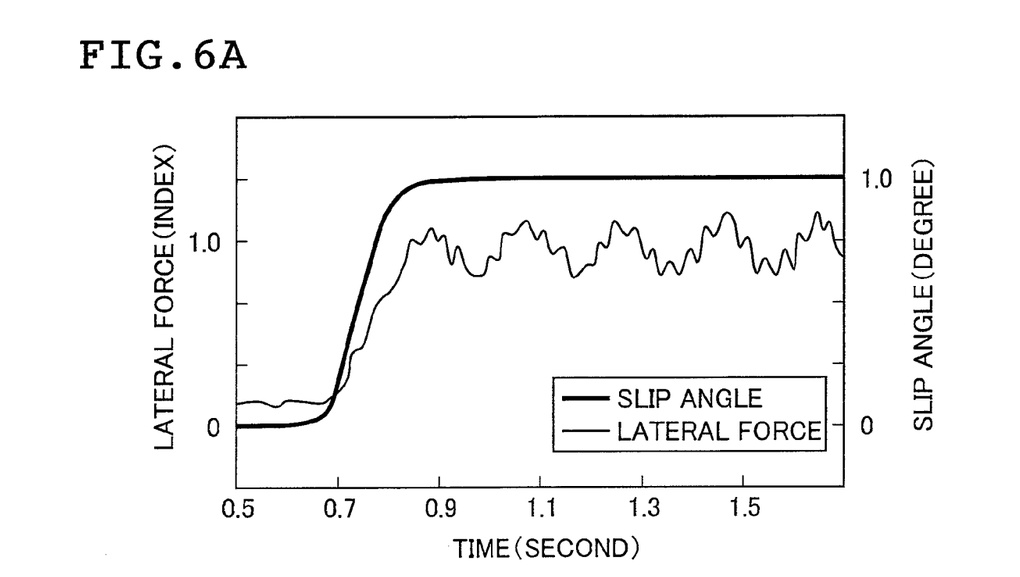
FIG. 6A is another graph showing the time-series variation of slip angle which is input to the measured tire and that of tire lateral force.
Figure 6B:
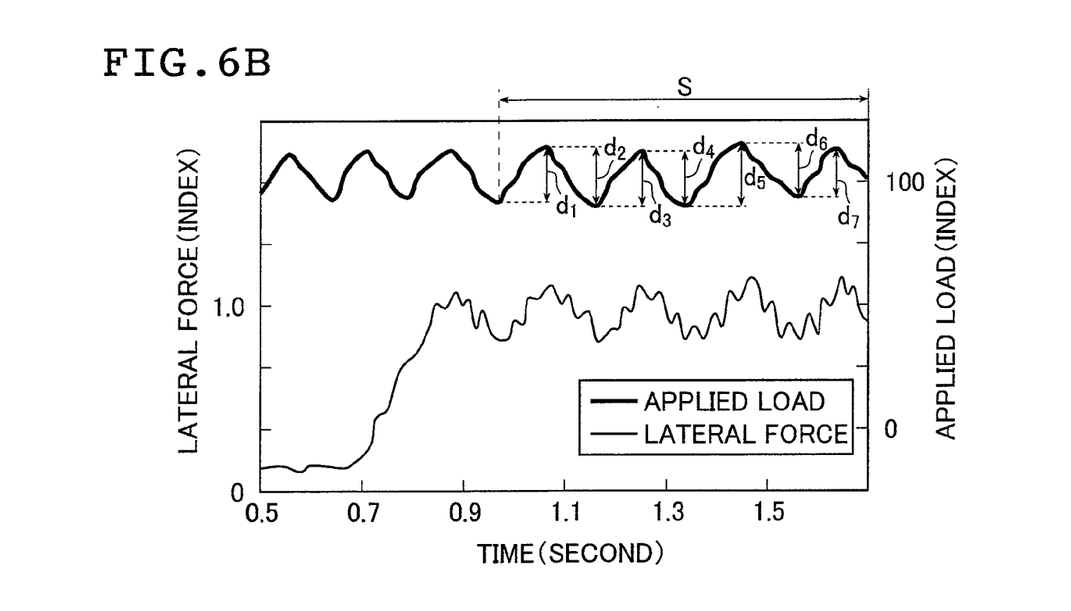
FIG. 6B is another graph showing the time-series variation of tire lateral force and that of load applied to the tire.

FIGS. 6A and 6B illustrate an example of various data measured in the device 10 in this second embodiment. FIG. 6A is a graph showing a time-series variation of slip angle input to the tire 12 and a time-series variation of tire lateral force acquired by the data acquisition portion 46 from the lateral force sensor 34 in the device 10. FIG. 6B is a graph showing the time-series variation of tire lateral force and a time-series variation of load applied to the tire, which is acquired by the data acquisition portion 46 from the load/displacement sensor 35. As shown in FIG. 6B, the load applied to the tire 12 varies within the range of ±20% to ±30% of the reference load.

Next, the variation amount calculating portion 52 of the judgment section 50 acquires each piece of the time-series information transmitted from the data acquisition portion 46 to calculate the applied load variation amount indicating the amount of a time-series variation of applied load information from the acquired time-series applied load information. The variation amount calculating portion 52 also calculates the tire lateral force variation amount indicating the amount of a time-series variation of tire lateral force information from the acquired time-series tire lateral force information (Step S108). Even in the second embodiment, to calculate the applied load variation amount, the variation amount calculating portion 52 calculates differences $d_1$ to $d_n$, each being a difference between the maximum value and the minimum value adjacent to the maximum value, in the graph of the time-series variation of the applied load information for all the (n) maximum values (and minimum values) within the predetermined time range S. Next, the variation amount calculating portion 52 calculates an average value of the calculated differences $d_1$ to $d_n$ as the applied load variation amount. Similarly, for the tire lateral force variation amount, an average value of the differences, each being a difference between the maximum value and the minimum value which are adjacent to each other, is obtained as the tire lateral force variation amount (not shown in FIG. 6B).

The applied load variation amount in this second embodiment represents a relatively large variation within the range of ±20% to ±30% of the reference value in the range of 1000 (N) to 6000 (N) corresponding to the range of the load generally applied to the tire mounted on the vehicle. The tire lateral force variation amount in this second embodiment represents a relatively large variation of tire lateral force, which is caused in response to the relatively large variation of applied load. The calculated applied load variation amount and tire lateral force variation amount are temporarily stored in the memory 19.

Next, for example, the CPU 17 judges whether or not the operation sequence in Steps S104 to S108 has been carried out for the number of repetition times set in Step S102 (Step S110). When the operation sequence has not been carried out yet for the set number, the result of judgment in Step S110 is No and the processing in Steps S104 to S108 is repeated again for the tire 12. The processing in Steps S104 to S108 is repeated until the result of judgment in Step S110 becomes Yes. In this second embodiment, the processing in Steps S104 to S108 is repeated for, for example, five times for the tire 12. In this second embodiment, as described above, the load to be applied is controlled based on the displacement to vary the applied load. Therefore, the time-series variation of applied load is not always constant. Specifically, if the variation of applied load is repeatedly measured, a state of the variation of applied load changes for each measurement and the applied load variation amount also changes. Therefore, it is apparent that the variation of tire lateral force, which is caused along with the variation of applied load, also changes, resulting in a change in tire lateral force variation amount.

Next, the evaluation value deriving portion 54 of the judgment section 50 receives the applied load variation amount and the tire lateral force variation amount, which are calculated and stored by the variation amount calculating portion 52 for each repetition time, from the memory 19 to derive the evaluation value based on the applied load variation amount and the tire lateral force variation amount (Step S112). In this second embodiment, as in the first embodiment, an approximate function expression showing the relation between the applied load variation amount and the tire lateral force variation amount in an approximated manner from plural sets (specifically, three sets in this second embodiment) of the applied load variation amount and the tire lateral force variation amount is derived. The thus obtained approximate function expression is used to calculate the evaluation value. For example, a linear function expression is used as the approximate function expression. A slope of the approximate function expression, which represents the tire lateral force variation amount using the applied load variation amount as a variable, is calculated as the evaluation value by using the least squares method or the like. It is believed that the thus calculated evaluation value accurately represents the degree of the variation of tire lateral force generated in the tire 12 in response to the relatively large variation of applied load.

Subsequently, as in the first embodiment, the judgment portion 56 of the judgment section 50 judges based on the derived evaluation value whether or not the tire 12 to be judged satisfies a desired characteristic (Step S114). For example, the evaluation value for a predetermined standard tire, which is obtained in advance by using the device 10, is used as the reference value (prestored in the memory 19). Then, the reference value and the evaluation value calculated for the tire 12 are compared with each other. According to the result of comparison, whether or not the tire 12 satisfies the desired characteristic is judged. As in the first embodiment, when the evaluation value calculated for the tire to be measured is larger than the reference value, the tire to be measured is judged as a tire without sufficient running stability performance. On the other hand, when the evaluation value obtained for the tire to be measured is smaller than the reference value, the tire to be measured is judged as a tire having sufficient running stability performance.

In the final step, the result of judgment obtained by the judgment portion 56 is output to and displayed on, for example, the display 18 (Step S116). At this time, besides the result of judgment obtained by the judgment portion 56, each piece of information derived by the processing of each portion of the judgment section 50 such as the graphs illustrated in FIGS. 6A and 6B may also be output to and displayed on the display 18.

The invention of the present application (each of the first and second embodiments) which uses the evaluation value to evaluate the running stability performance of the tire as described above is devised based on the following idea. If the cornering force generated in the tire is varied more greatly than needed in response to a variation of load applied to the tire while the vehicle is running, the behavior of the vehicle in cornering becomes unstable. The inventor of the present invention noticed that the degree of stability of (the degree of variation of) the cornering force generated in the tire with respect to the variation of load applied to the tire directly affects the degree of handling stability and controllability when the vehicle, on which the tire is mounted, is driven. Then, based on this idea, the inventor of the present invention has keenly examined a method of easily and highly accurately evaluating the running stability performance of the tire to devise the invention of the present application. For the present invention, among the data obtained by tire tests conventionally conducted by the conventional indoor cornering test devices, the inventor of the present invention understood, for example, the relation between a varying component of the applied load by the feedback control and a varying component of the tire lateral force, which had been considered as being of no importance. The inventor of the present invention has conducted, for example, the following experiment to confirm the relation between the varying components (load and lateral force) and the physical meaning of the relation, which resulted in the invention of the present application. The invention of the present application is devised as a result of many trial and error processes conducted by the inventor of the present application.

The device 10 in the embodiments can be easily configured by using the conventional indoor cornering test device. Further, the judging method in the embodiments can be carried out by using the data acquired by the tire tests which are conventionally carried out by using the conventional indoor cornering test device. The application of the present invention allows highly accurate judgment of the running stability performance of the tire without greatly increasing the labor, time and cost as compared with the conventional cases. The application of the tire characteristic judging method according to the present invention allows highly accurate judgment of the running stability performance of the tire to select, for example, the specification of the tire having sufficient running stability for each specification by using the data acquired by the conventional indoor cornering test device without the actual vehicle steering feeling test requiring much time and labor for each of the trial tires having different specifications (different structure or material property), which are manufactured in the development of the tire.

The method and the device for evaluating the tire characteristic according to the present invention, which use the device 10, have been described above. However, the present invention is not limited thereto. The evaluation value in the invention of the present application is not limited to the slope of the approximate function expression showing the tire lateral force variation amount determined in response to the applied load variation amount. For example, the tire lateral force variation amount, which is generated in response to a predetermined applied load variation amount supposed to be generated during the cornering of the vehicle, on which the tire to be measured is actually mounted, may be used as the evaluation value. For example, the tire lateral force variation amount may be used as the evaluation value when the applied load variation amount is within the range of 5 to 30% of the average value of the applied load information (basically, corresponding to the set applied load). In the first embodiment, in particular, it is sufficient to use the tire lateral force variation amount when the applied load variation amount is within the range of 5% of the average value of the applied load information (basically, corresponding to the set applied load) as the evaluation value. Alternatively, instead of inputting the slip angle applied to the tire to be measured as the ramp step, the time-series variation information may be acquired at a fixed slip angle. Each of the applied load variation amount and the lateral force variation amount (cornering force variation amount) is not limited to the average value of the differences between the maximum value and the minimum value, which are adjacent to each other. Other information may be used as each of the applied load variation amount and the lateral force variation amount as long as the information represents the amount of variation in time-series information. For example, as the applied load variation amount, the maximum difference among the differences, may be used.

Hereinafter, the contents and the results of the confirmatory experiments conducted for confirming the effects of the invention of the present application are described. As the confirmatory experiments, two types of evaluation experiments for evaluating the running stability of the tire were conducted for each of two tires, a tire A and a tire B. One of the evaluation experiments was the actual vehicle steering feeling test, whereas the other evaluation experiment was a test for deriving the evaluation value by using the device 10 in the first embodiment. In the actual vehicle steering feeling test, a plurality of target tires (the tires A or the tires B) of the same specification were sequentially mounted in all the tire-mounting positions of a predetermined vehicle to be evaluated (passenger vehicle). The vehicle was driven and operated by a tester who had an appropriate skill (specially trained for) for the feeling test in a predetermined driving course. Then, the tester relatively evaluated the degree of handling stability and controllability of the vehicle felt by himself/herself in the driving operation of the vehicle. Specifically, the tester was invited to determine whether or not the degree of handling stability and controllability when the target tires B were mounted was higher or lower as compared with the case where the target tires A were mounted. Both the tire A and the tire B had the same tire size of 195/65R15. Each rim to which the tire was mounted is also the same, 15×6JJ. A pneumatic pressure of the tire at the start of driving was constantly set to 200 kPa.

As a reference score in the evaluation, the degree of handling stability and controllability when the tires A were mounted was given points three. When the tester felt that higher handling stability and controllability were obtained with the tires A, the tester gave a score under three to the tires B. On the other hand, when the tester felt that higher handling stability and controllability were obtained with the tires B. the tester gave a score over three to the tires B. Specifically, when higher handling stability and controllability were obtained with the tires A and a difference in handling stability and controllability performance was small enough to be perceived only by a professional driver, the tire B got 2.5 points. When higher handling stability and controllability were obtained with the tires B and a difference in handling stability and controllability performance was small enough to be perceived only by a professional driver, the tire B got 3.5 points. When higher handling stability and controllability were obtained with the tires B and a difference in handling stability and controllability performance was large enough to be perceived even by a general driver, the tire B got 4.0 points. As a result of scoring, the tire B got 3.5 points. As compared with three points given in advance for the tire A, the score of the tire B was slightly higher than that of the tire A. Specifically, based on the result of the actual vehicle steering feeling test, the tire B had slightly improved handling stability and controllability as compared with the tire A.

Each of the tire A and the tire B was manufactured of a double-layered steel belt and a double-layered polyester carcass code. Each of the tire A and the tire B also had a double-layered belt cover layer made of a nylon code for covering the belt ends and the entire surface of a belt layer in the structure. The tire A and the tire B are different in that a bead filler of the tire A had a height of 30 mm and that of the tire B had a relatively larger height of 40 mm. It is generally known that relatively higher handling stability and controllability are obtained with a relatively large bead filler height. Therefore, it is believed that the result of the actual vehicle steering feeling test agrees well with the general tendency.

Figure 7:
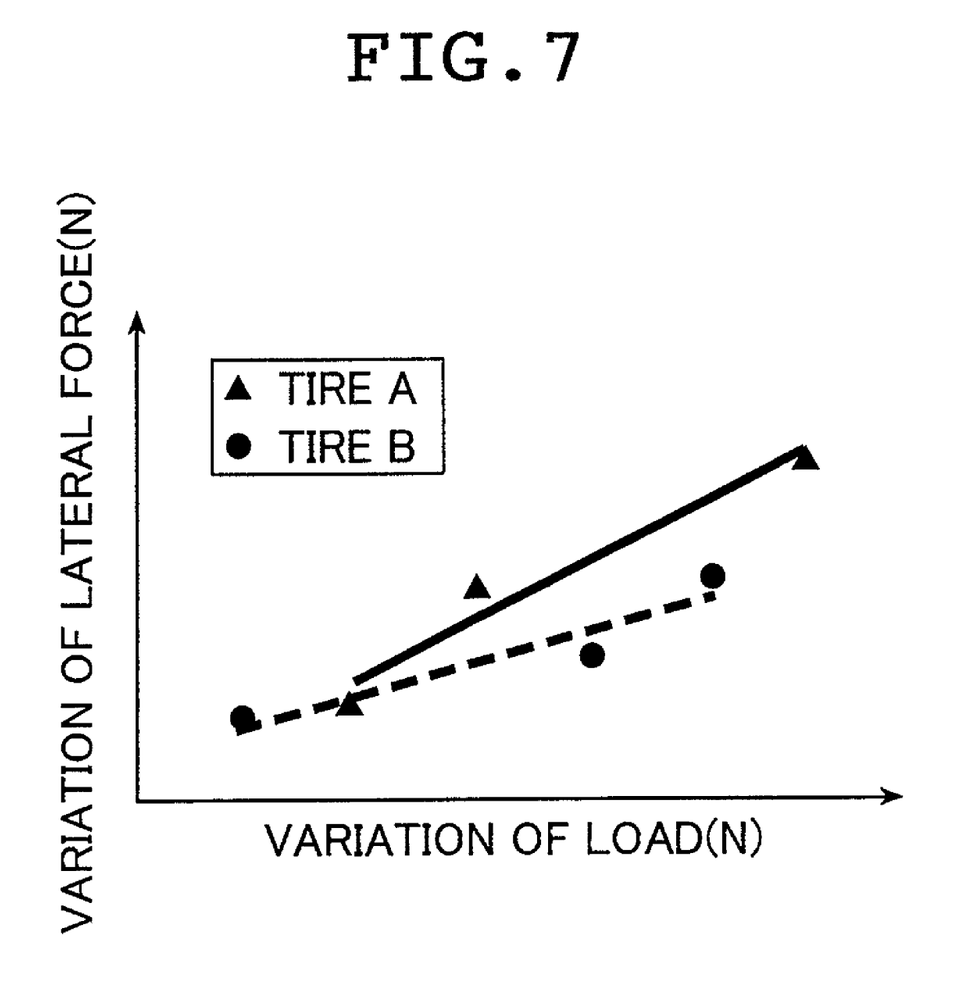
FIG. 7 is a view for illustrating an evaluation value obtained by the tire characteristic judging device illustrated in FIG. 1.

On the other hand, in the test for deriving the evaluation values by using the device 10, the processing in Steps S102 to S112 was conducted for each of the tires A and tires B to derive the evaluation value for each of the tires A and tires B. As the evaluation value, the slope of the above-mentioned approximate function expression (linear function expression) representing the tire lateral force variation amount using the applied load variation amount was calculated. As the evaluation value, the tire lateral force variation amount when the applied load variation amount was within the range of 10% of the average value of the applied load was also obtained. The following Table 1 collectively shows the results of the test for deriving the evaluation values and the actual vehicle steering feeling test. In Table 1, for the tire lateral force variation amount when the applied load variation amount is within the range of 10% of the average value of the applied load, the tire lateral force variation amount of the tire A is represented by 100, whereas the tire B is represented by an index with respect to the tire A. FIG. 7 is a graph showing plural sets (specifically, three sets in the embodiment) of the applied load variation amount and the tire lateral force variation amount, which are obtained by using the device 10, for each of the tires A and tires B, each having different specifications. FIG. 7 also shows the approximate function expression (linear approximate function expression) showing the relation between the applied load variation amount and the tire lateral force variation amount in an approximated manner.

TABLE 1

| | Tire lateral force variation amount (Variation of applied load; 10%) | Slope of approximate function expression | Result of actual vehicle steering feeling test |
|---|---|---|---|
| Tire A | 100 | 0.5545 | 3 |
| Tire B | 69 | 0.2911 | 3.5 |

As can be seen from Table 1 and the graph shown in FIG. 7, the evaluation values of the tire B derived by using the device 10 were lower than those of the tire A. It is believed that the variation of tire lateral force generated in cornering is smaller and the handling stability and controllability of the vehicle on which the tires are mounted is higher as the evaluation values are smaller. The evaluation values derived by using the device 10 in the embodiments accurately represents the degree of the variation of tire lateral force generated in the tire 12, which is caused in response to the subtle variation of applied load. The result of evaluation using the device 10 agrees well with the result of the actual vehicle steering feeling test. Therefore, the running stability performance of the tire can be evaluated by using the device 10.

It is assumed that the tire A is a standard tire and the evaluation value of the tire A, for example, the slope of the linear function expression, is prestored in the memory 19. In this case, if Steps S102 to S114 described above are carried out for the tire B, the tire B to be measured is judged as having sufficient running stability performance. For example, when the evaluation value for the standard tire, for which the running stability performance of the tire is pre-confirmed by the actual vehicle steering feeling test, is known in advance (specifically, if the reference value can be set), it is confirmed that a precise result of judgment for the running stability of the tire can be obtained by using the judging method and judging device according to the present invention without carrying out a laborious and time-consuming test such as the actual vehicle steering feeling test for the tire.

Although the tire characteristic judging method and the tire characteristic judging device according to the present invention have been described above in detail, the present invention is not limited to the above-mentioned embodiments. It is apparent that various modifications and changes are possible without departing from the scope of the present invention.

What is claimed is:

1. A tire characteristic judging method of judging a tire characteristic, comprising the steps of:

acquiring each of applied load information representing a load applied to a tire and cornering force information representing a cornering force generated in the tire in time series while the tire is rolling at a predetermined rolling speed to be in contact with a road surface with a predetermined slip angle being applied to the tire;

calculating an applied load variation amount representing a time-series variation of the applied load information from the acquired time-series applied load information and a cornering force variation amount representing a time-series variation of the cornering force information from the acquired time-series cornering force information;

obtaining an evaluation value determined based on the applied load variation amount and the cornering force variation amount; and comparing the evaluation value and a preset reference value with each other and judging whether or not the tire satisfies a desired characteristic according to a result of comparison.

2. The tire characteristic judging method according to claim 1, wherein:

the load applied to the tire is applied by a load application machine for applying the load to the tire in the step of acquiring each information; and the load application machine performs a feedback control to make the load applied to the tire closer to a given value according to a value of the currently acquired applied load information during the step of acquiring each information.

3. The tire characteristic judging method according to claim 1, wherein:

the load applied to the tire is applied by a load application machine for applying the load to the tire in the step of acquiring each information; and the load application machine varies the applied load in time during the step of acquiring each information.

4. The tire characteristic judging method according to claim 3, wherein:

a distance between a tire shaft of the tire and a ground-contact surface is obtained in time series; and the load application machine adjusts the distance according to information of the currently acquired distance to make the distance to be a target distance which corresponds to a preset time-series condition of the distance, thereby varying the applied load in time series.

5. The tire characteristic judging method according to claim 1, further comprising repeating the steps of acquiring each information and calculating the variation amounts prior to the step of obtaining the evaluation value, wherein:

plural sets of the applied load variation amount and the cornering force variation amount, each set obtained in each repetition time of the step of calculating the variation amounts are used to derive an approximate function expression which represents a relation between the applied load variation amount and the cornering force variation amount in an approximated manner in the step of obtaining the evaluation value; and the derived approximate function expression is used to calculate the evaluation value.

6. The tire characteristic judging method according to claim 5, wherein:

the approximate function expression is a linear function expression in which the cornering force variation amount is determined according to the applied load variation amount; and a slope of the linear function expression is calculated as the evaluation value.

7. The tire characteristic judging method according to claim 1, wherein:

a value of the cornering force variation amount when the applied load variation amount is within a predetermined range is calculated as the evaluation value in the step of calculating the evaluation value; and the predetermined range corresponds to 5 to 30% of an average value of the applied load information.

8. The tire characteristic judging method according to claim 7, wherein:

a value of the cornering force variation amount when the applied load variation amount is a predetermined value is obtained as the evaluation value in the step of obtaining the evaluation value; and the predetermined value corresponds to 5% of the average value of the applied load information.

9. The tire characteristic judging method according to claim 1, wherein:

the obtained evaluation value and the preset reference value are compared with each other in the step of the judging;

a degree of handling stability and controllability of the tire is classified according to a result of comparison; and a result of classification is output.

10. The tire characteristic judging method according to claim 9, wherein the reference value is the evaluation value obtained for a standard tire in the step of obtaining the evaluation value, the standard tire having a known degree of the handling stability and controllability.

11. The tire characteristic judging method according to claim 1, wherein the predetermined slip angle is in a range of 1 to 3 degrees.

12. The tire characteristic judging method according to claim 1, wherein the predetermined rolling speed is in a range of 80 to 120 (km/hour).

13. A tire characteristic judging device for judging a tire characteristic, comprising:

an information acquisition portion for acquiring each of applied load information representing a load applied to a tire and cornering force information representing a cornering force generated in the tire in time series while the tire is rolling at a predetermined rolling speed to be in contact with a road surface with a predetermined slip angle being applied to the tire;

a variation amount calculating portion for calculating an applied load variation amount representing a time-series variation of the applied load information from the acquired time-series applied load information and a cornering force variation amount representing a time-series variation of the cornering force information from the acquired time-series cornering force information;

an evaluation value deriving portion for calculating an evaluation value determined based on the applied load variation amount and the cornering force variation amount; and a judgment portion for comparing the evaluation value and a preset reference value with each other and judging whether or not the tire satisfies a desired characteristic according to a result of comparison.

14. The tire characteristic judging device according to claim 13, wherein:

the acquiring the applied load information and the cornering force information and the calculating the applied load variation amount and the cornering force variation amount are repeated in the information acquisition portion and the variation amount calculating portion; and the evaluation value deriving portion uses plural sets of the applied load variation amount and the cornering force variation amount, each set calculated in each repetition time to derive an approximate function expression which represents a relation between the applied load variation amount and the cornering force variation amount in an approximated manner and uses the derived approximate function expression to calculate the evaluation value.

15. The tire characteristic judging device according to claim 14, wherein:

the approximate function expression is a linear function expression representing the cornering force variation amount determined according to the applied load variation amount; and a slope of the linear function expression is calculated as the evaluation value.

\* \* \* \* \*